(12) United States Patent
Ando et al.

(10) Patent No.: US 6,980,621 B2
(45) Date of Patent: Dec. 27, 2005

(54) MAIN STEAM SYSTEM AROUND NUCLEAR REACTOR

(75) Inventors: Koji Ando, Hitachi (JP); Masaaki Tsubaki, Hitachi (JP); Shouichirou Kinoshita, Hitachi (JP); Masayoshi Matsuura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/853,211

(22) Filed: May 26, 2004

(65) Prior Publication Data

US 2005/0135548 A1    Jun. 23, 2005

Related U.S. Application Data

(62) Division of application No. 10/386,551, filed on Mar. 13, 2003.

(51) Int. Cl.[7] .............................................. G21C 19/28
(52) U.S. Cl. ...................... 376/371; 376/366; 376/361; 376/210; 376/241; 376/370
(58) Field of Search ................................ 376/210, 371, 376/241, 361, 366, 370

(56) References Cited

U.S. PATENT DOCUMENTS 4,518,560 A * 5/1985 Takaku et al. ............... 376/245
4,947,485 A * 8/1990 Oosterkamp ................ 376/210

FOREIGN PATENT DOCUMENTS

| JP | 11-14787 | | 1/1909 |
| JP | 08-179085 | * | 7/1996 |
| JP | 10-020069 | * | 1/1998 |
| JP | 10-020070 | * | 1/1998 |
| JP | 10-090466 | * | 4/1998 |
| JP | 2001-4788 | | 1/2001 |

* cited by examiner

Primary Examiner—Jack Keith
Assistant Examiner—R Palabrica
(74) Attorney, Agent, or Firm—Mattingly, Stanger, Malur & Brundidge, P.C.

(57) ABSTRACT

A main steam system around a nuclear reactor which comprises two main steam nozzles in a reactor pressure vessel, each of the main nozzles being disposed at a symmetrical position with respect to a plane parallel to steam outlet faces of steam dryers provided inside the reactor pressure vessel and passing through a center of the reactor pressure vessel; and main steam pipes each connected to the main steam nozzles.

2 Claims, 7 Drawing Sheets

⇨ STEAM FLOW

FIG. 9

⇨ STEAM FLOW

FIG. 10

⇨ STEAM FLOW

FIG. 11

⇒ STEAM FLOW

FIG. 12

⇒ STEAM FLOW

FIG. 13

⇒ STEAM FLOW

FIG. 14

⇒ STEAM FLOW

MAIN STEAM SYSTEM AROUND NUCLEAR REACTOR

This is a divisional application of U.S. Ser. No. 10/386,551, filed Mar. 13, 2003.

BACKGROUND OF THE INVENTION

1. Field of the Invention

The present invention relates to a main steam system around a nuclear reactor.

2. Prior Art

Figure 5:
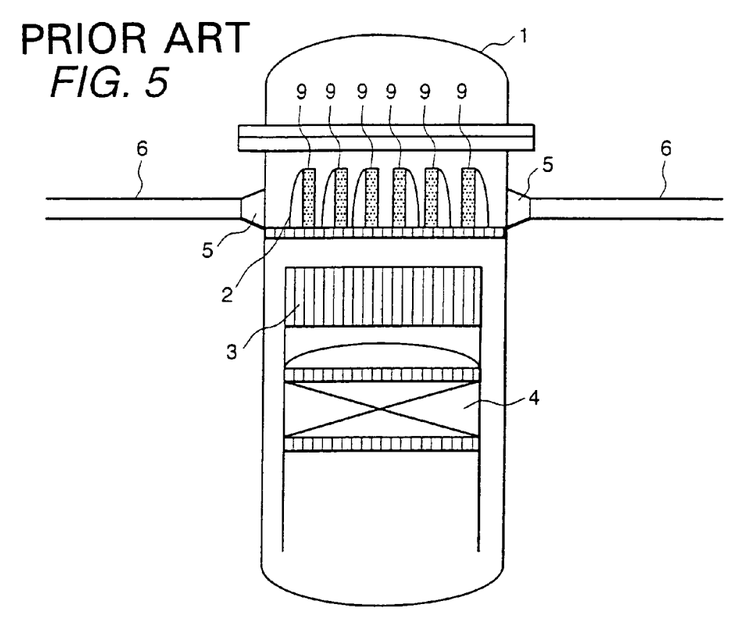
FIG. 5 is a vertical cross-sectional view of a reactor pressure vessel which shows the construction of a conventional main steam system around nuclear reactor.
Figure 6:
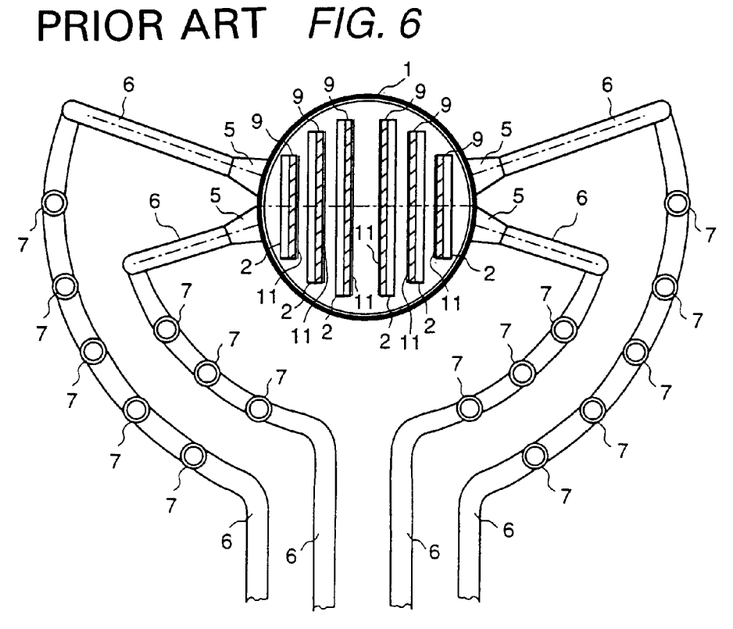
FIG. 6 is a cross-sectional plan view of the reactor pressure vessel which shows the construction of the conventional main steam system around nuclear reactor.

A conventional main steam system around a nuclear reactor in a nuclear power plant is shown in FIG. 5 to FIG. 8. In the conventional main steam system around the nuclear reactor, steam separators 3 and steam dryers 2 are arranged inside a reactor pressure vessel 1 in order to separate a steam-water mixed flow flowing out of a reactor core 4 into steam to be fed to a steam turbine and water to be recirculated into the reactor core 4, as shown in FIG. 5 and FIG. 6.

Figure 7:
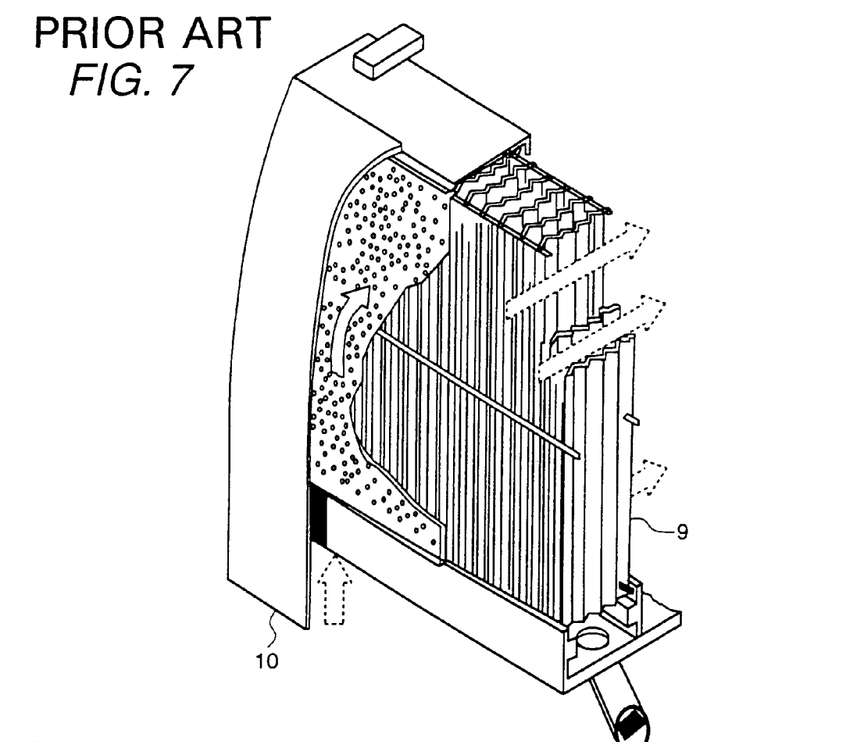
FIG. 7 is a partially cutaway perspective view showing a steam dryer.

Among these core internals, the steam dryer 2 includes a plurality of corrugated plates 9 which are aligned parallel to each other to form steam passages between the corrugated plates 9, as shown in FIG. 7. Since the steam flows along the corrugated plate to change the flow direction many times while passing through the gap between the corrugated plates 9, moisture contained in the steam is removed every flow direction change. After that, dry steam obtained by removing moisture from the steam flows out of a steam outlet face 11 of the steam dryer 2 to an upper dome of the reactor pressure vessel 1, and then, the dry steam flows out of the reactor pressure vessel 1 to be conducted to a steam turbine through four main steam nozzles 5 and main steam pipes 6. The flow of the steam inside the steam dryer 2 at that time is shown by hollow arrows in FIG. 8.

On the other hand, the four main steam nozzles 5 are arranged at positions symmetrical with respect to a plane which is parallel to the steam outlet faces of the steam dryers 2 and passes the center of the reactor pressure vessel 1. Further, each of the steam outlet faces 11 of the steam dryers 2 is arranged so as to face the side of the center of the reactor pressure vessel 1, as shown in FIG. 5.

Furthermore, a plurality of main steam safety relief valves 7 for moderating abnormal pressure rise in the reactor pressure vessel 1 are distributively arranged along each of the four main steam pipes 6. The main steam safety relief valve 7 is closed during normal operation of the reactor. However, when pressure in the reactor pressure vessel increases and reaches a set pressure of the main steam safety relief valves 7, the main steam safety relief valves 7 are opened in order to secure safety by relieving steam inside the reactor pressure vessel to the outside of the reactor pressure vessel.

In order to secure the safety in a short time, a plurality of main steam safety relief valves such as those disclosed, for example, in Japanese Patent Application Laid-Open No. 11-14787 are arranged in each of four main steam pipes connected to a reactor pressure vessel, as disclosed in Japanese Patent Application Laid-Open No. 2001-4788.

SUMMARY OF THE INVENTION

Figure 12:
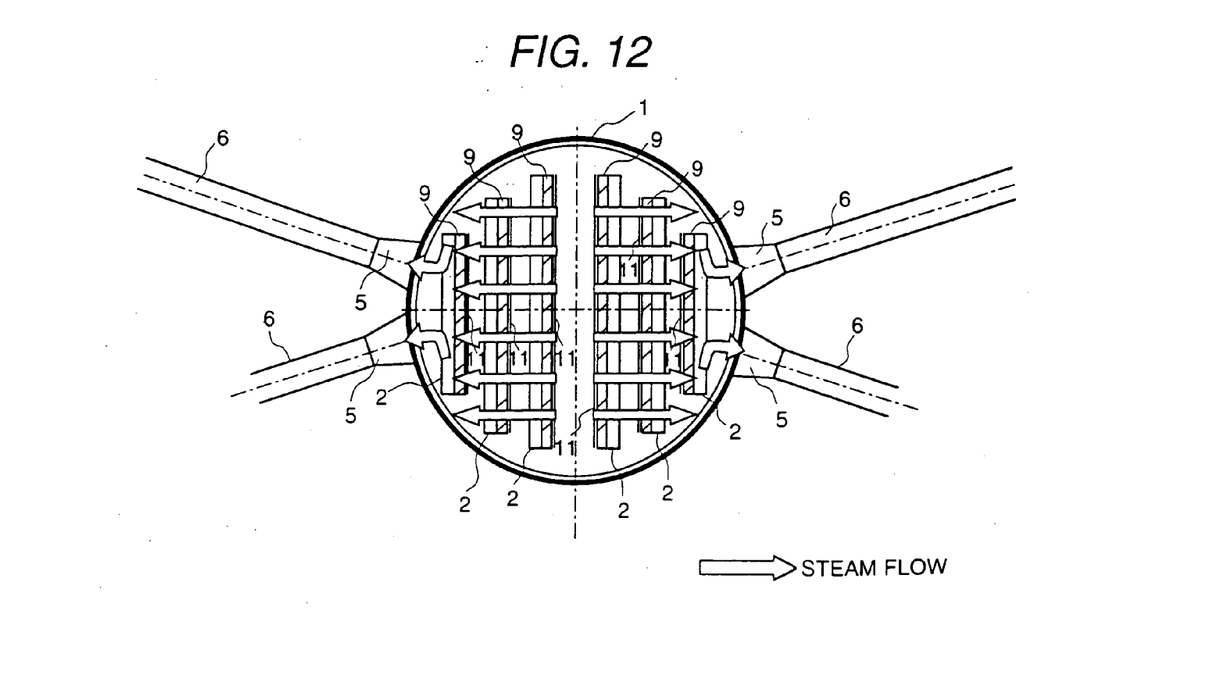
FIG. 12 is a cross-sectional plan view of a reactor pressure vessel which shows steam flow inside the reactor pressure vessel in a conventional example.

In a conventional main steam system around a nuclear reactor comprising four main steam pipes 6 as shown in FIG. 6, dry steam inside the reactor pressure vessel bilaterally symmetrically flows, and evenly flows into the four main pipes 6 through the main steam nozzles 5, as shown by hollow arrows in FIG. 12.

In a nuclear power plant having a smaller thermal power (thermal power: below approximately 1800 MW) compared to the conventional nuclear power plant, there are prospects that number of main steam pipes 6 can be reduced from the conventional number of four to two pipes without substantial changes in diameter of the main steam pipe 6 because of smaller amount of steam generated in the reactor pressure vessel.

Figure 10:
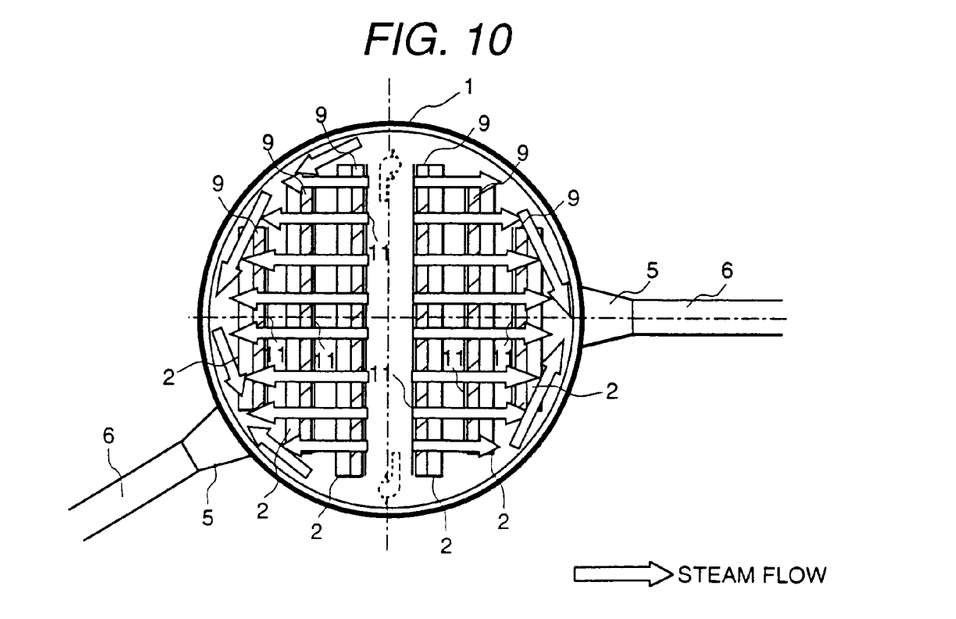
FIG. 10 is a cross-sectional plan view of a reactor pressure vessel which shows uneven steam flow inside the reactor pressure vessel.

In a case where number of the main steam pipes 6 (and accordingly, number of the main steam nozzles 5) can be reduced smaller comparing to the case of the conventional plant, and the number of the main steam pipes can be reduced to two, there is a possibility that unstable flow portions of steam flowing out of the steam dryers 2 may appear because of loss of the symmetry in the steam flow pattern if the main steam pipes are inappropriately arranged, for example, as shown by hollow arrows expressing steam flow in FIG. 10. Therefore, steam does not flow smoothly compared to steam flow in the conventional nuclear reactor vessel to increase pressure drop caused in the total main steam system, which may deteriorate the performance of the nuclear power plant compared to that of the conventional nuclear power plant.

In addition, although it is also preferable that steam evenly flows through all the steam dryers 2, steam flowing through the steam dryers 2 becomes uneven if the steam after flowing out of the steam dryers 2 does not smoothly flows, which may deteriorate the performance of the nuclear plant.

An object of the present invention is to suppress deterioration of performance of a main steam system when number of main steam pipes connected to a reactor pressure vessel is reduced.

A first means to solve the problems is a main steam system around a nuclear reactor which comprises two main steam nozzles in a reactor pressure vessel, each of the main nozzles being disposed at a symmetrical position with respect to a plane parallel to steam outlet faces of steam dryers provided inside the reactor pressure vessel and passing through a center of the reactor pressure vessel; and main steam pipes each connected to the main steam nozzles.

Similarly, a second means is that in the first means, the main steam pipes, preferably, two main steam pipes, are individually connected to the reactor pressure vessel through the main steam nozzles in 180°-symmetrical positional relation.

Similarly, a third means is a main steam system around a nuclear reactor, which comprises steam dryers arranged in a reactor pressure vessel, steam outlet faces of the individual steam dryers being oriented in an equal direction; two main steam nozzles each located at positions in a half-circumferential portion in the equal direction of the reactor pressure vessel, each of the positions being symmetrical with respect to a vertical plane passing through the center of the reactor pressure vessel and intersecting the steam outlet faces at right angle; and main steam pipes, each of the main steam pipes being connected to the main steam nozzle.

Similarly, a fourth means is that in any one of the first means to the third means, the fourth means further comprises main steam headers connected to the reactor pressure vessel so as to receive steam inside the reactor pressure vessel; and main steam safety relief valves for relieving the steam from the header to the outside when steam pressure reaches a preset pressure.

Similarly, a fifth means is that in the fourth means, the plurality of main steam safety relief valves are distributively disposed in the main steam pipes and the main steam headers.

Similarly, a sixth means is that in the fifth means, connecting positions of the main steam headers to the reactor pressure vessel are symmetrical to disposing positions of the main steam nozzle in the reactor pressure vessel with respect to a vertical plane passing through the center of the reactor pressure vessel and intersecting the steam outlet faces at right angle.

DESCRIPTION OF THE PREFERRED EMBODIMENTS

Each embodiment in accordance with the present invention will be described below, referring to the accompanying drawings. The first embodiment shown in FIG. 1 comprises steam separators 3 above a reactor core 4 within a cylindrical reactor pressure vessel 1 (as illustrated in FIG. 5) having a circular cross section, and containing the reactor core 4; and steam dryers 2 above the steam separators 3.

Figure 1:
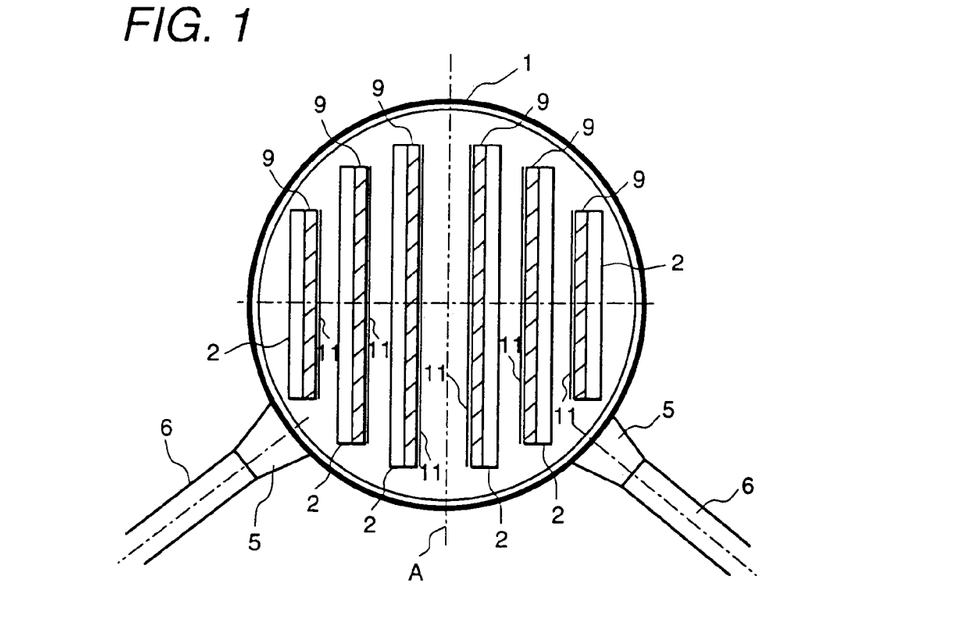
FIG. 1 is a cross-sectional plan view of a reactor pressure vessel which shows the construction of a first embodiment of a main steam system around a nuclear reactor in accordance with the present invention.

Two main steam nozzles 5 are individually connected to the reactor pressure vessel 1 at bilaterally symmetrical positions in a lower half-circumferential portion of the reactor pressure vessel. Main steam pipes 6 are individually connected to the main steam nozzle 5. A plurality of main steam safety relief valves are provided in each of the main steam pipes 6.

Figure 8:
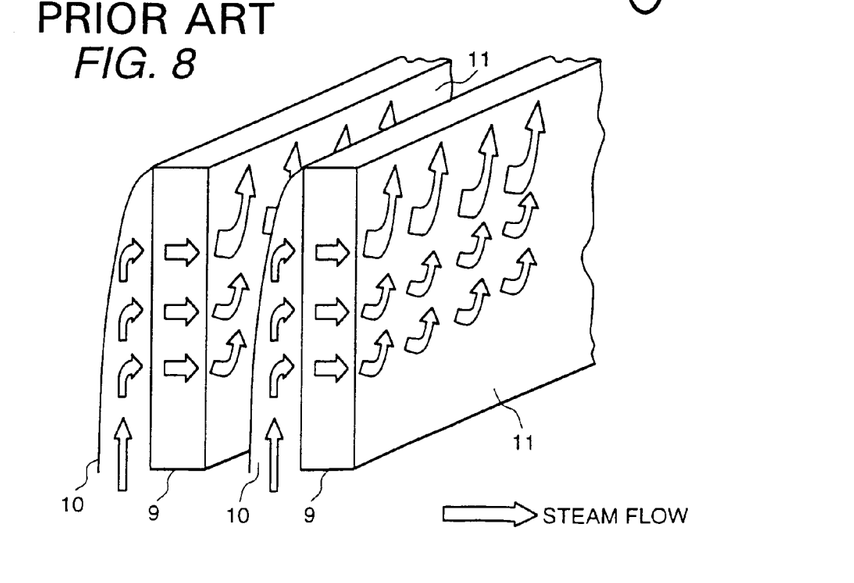
FIG. 8 is a perspective view showing steam flow in steam dryers.

The steam dryer 2 has a construction similar to that of the steam dryer 2 shown in FIG. 7 and FIG. 8, and has a function of removing moisture from steam while the steam is flowing inside a hood 10 of the steam dryer 2 from the bottom to the top, and then passing through the gaps between the corrugated plates 9. The steam losing moisture becomes dry steam, and flows out of a steam outlet face 11 of the steam dryer 2.

The steam outlet faces 11 of the individual steam dryers 2 are oriented toward the central direction of the reactor pressure vessel 1. Therefore, a set of the main steam nozzle 5 and the main steam pipe 6 is disposed at each symmetrical position with respect to a plane parallel to the steam outlet face 11 of the steam dryer 2 and passing through the center of the reactor pressure vessel 1, that is, with respect to a vertical plane including a dash-and-dot line A passing through the center of the reactor pressure vessel. Similarly, each of the steam dryers 2 is also symmetrically arranged.

In such a main steam system around nuclear reactor described above, coolant in the reactor pressure vessel 1 is heated by the reactor core 4 to be changed to steam-water two-phase flow, and flows out into the upper portion of the reactor core 4. The steam-water two-phase flow flows into the steam separators 3 to be excluded the liquid phase portion, and only the steam is fed into the steam dryers 2 to be changed to dry steam by removing the moisture by the steam dryers 2.

Figure 13:
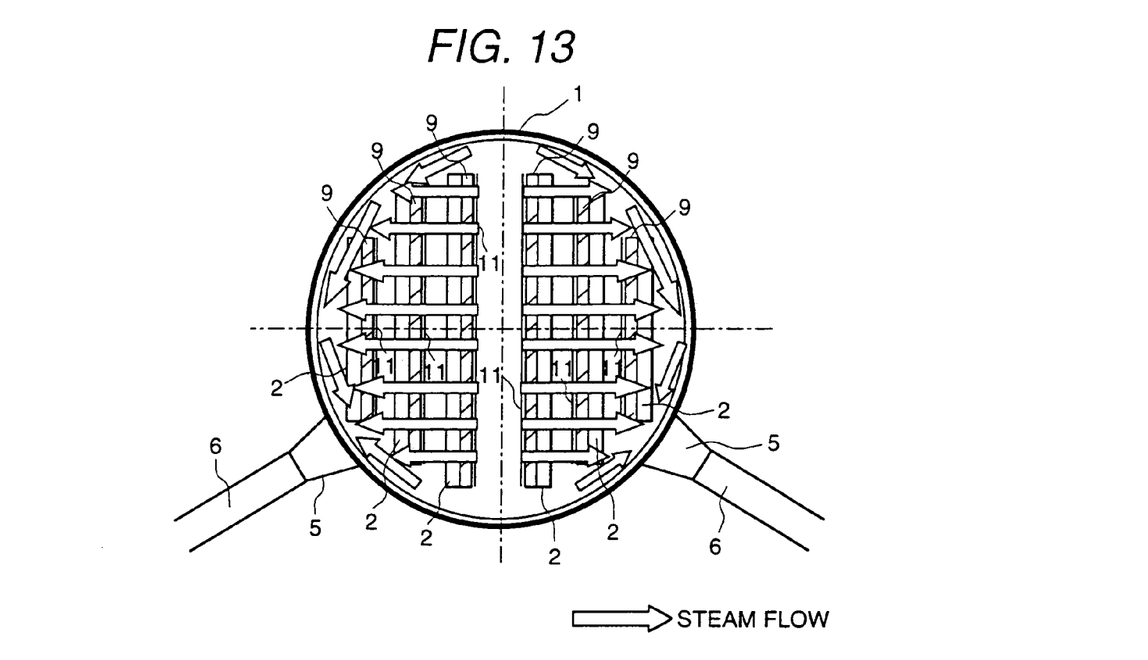
FIG. 13 is a cross-sectional plan view of the reactor pressure vessel which shows steam flow inside the reactor pressure vessel in the first embodiment in accordance with the present invention.

The dry steam bilaterally symmetrically flows from the steam outlet faces 11 of the steam dryers 2 as shown by the hollow arrows in FIG. 13, and equally flows into the main steam pipes 6 through the main steam nozzles 5, and then is fed to a turbine apparatus for driving a generator. Dry steam used as energy for rotationally driving the turbine of the turbine apparatus is returned to liquid to be fed to the reactor pressure vessel 1 as the coolant again.

In a case of disposing a plurality of main steam pipes 6, it is preferable that steam equally flows through the individual main steam pipes 6. However, if the main steam pipes 6 are inappropriately arranged, for example, as shown by hollow arrows expressing steam flow in FIG. 10, there is a possibility that unstable or non-uniform flow portions of steam flowing out of the steam dryers 2 may appear because of loss of the symmetry in the steam flow pattern. Therefore, steam does not flow smoothly compared to steam flow in the conventional nuclear reactor vessel to increase pressure drop caused in the total main steam system, which may deteriorate the performance of the nuclear power plant compared to that of the conventional nuclear power plant.

According to the present embodiment, in a case of disposing, particularly, two main steam pipes 6, steam flow in the reactor pressure vessel 1 becomes symmetrical flow as shown by hollow arrows in FIG. 13, and accordingly the steam equally flows in the two main steam pipes 6. Thereby, symmetrical main steam flow equivalent to that in the conventional plant having four main steam pipes 6 can be formed in the plant having two main steam pipes 6, and accordingly, deterioration in performance of the main steam system can be prevented.

When pressure in the reactor pressure vessel 1 reaches a set pressure of the main steam safety relief valves 7, the main steam safety relief valves 7 open. As the main steam safety relief valves 7 open, the steam inside the reactor pressure vessel 1 is discharged from the main steam safety relief valves 7 into cooling water in a pressure suppression chamber from through the main steam nozzles 5 and the main steam pipes 6. Thereby, the reactor pressure vessel 1 can avoid various events caused by excessive pressure rise. As described above, the discharged steam is condensed in the cooling water in the pressure suppression chamber.

Figure 2:
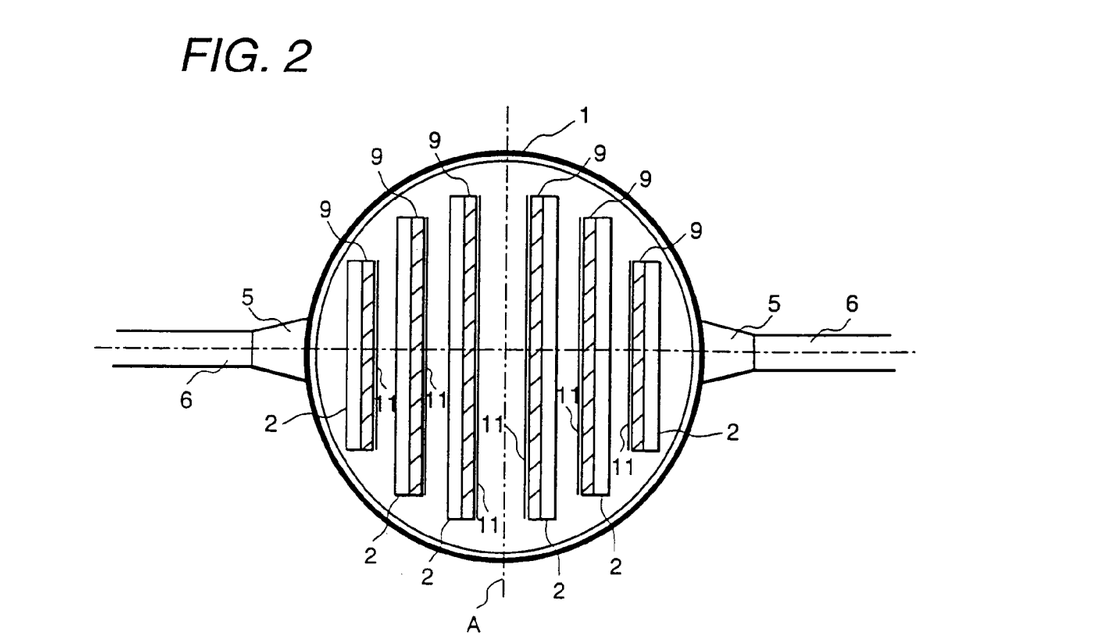
FIG. 2 is a cross-sectional plan view of a reactor pressure vessel which shows the construction of a second embodiment of a main steam system around a nuclear reactor in accordance with the present invention.

The second embodiment, to be described below, is a main steam system around a nuclear reactor which is obtained by partially modifying the first embodiment, as shown in FIG. 2. A modified portion is as follows. That is, the disposing positions of the main steam pipes 6 and the main steam nozzles 5 are 180°-symmetrical in angle, as shown in FIG. 2. The other constructions are the same as those of the first embodiment. Accordingly, description on the other constructions will be omitted.

Figure 9:
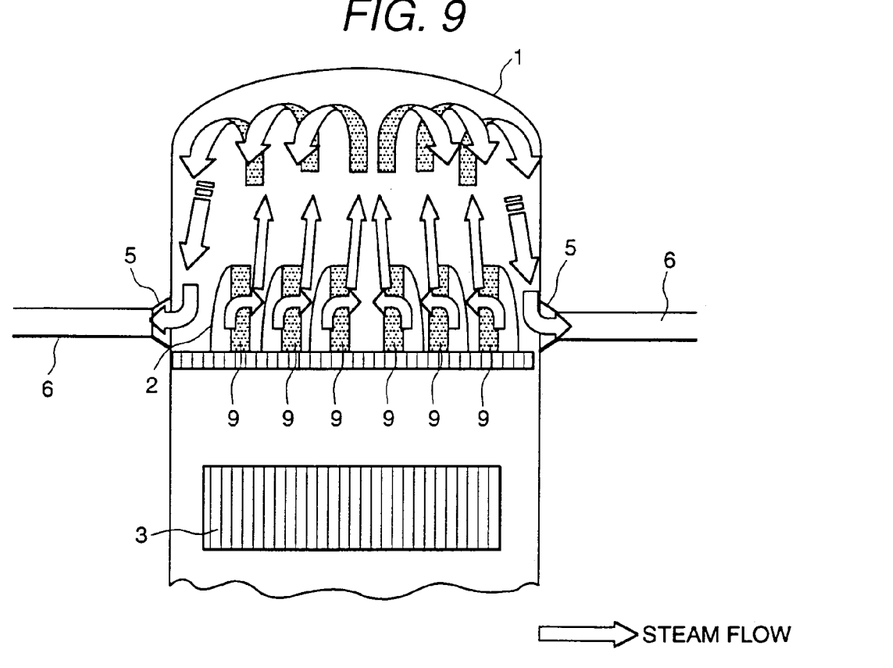
FIG. 9 is a view showing steam flow on a vertical cross-sectional plane inside the reactor pressure vessel in the second embodiment in accordance with the present invention.
Figure 14:
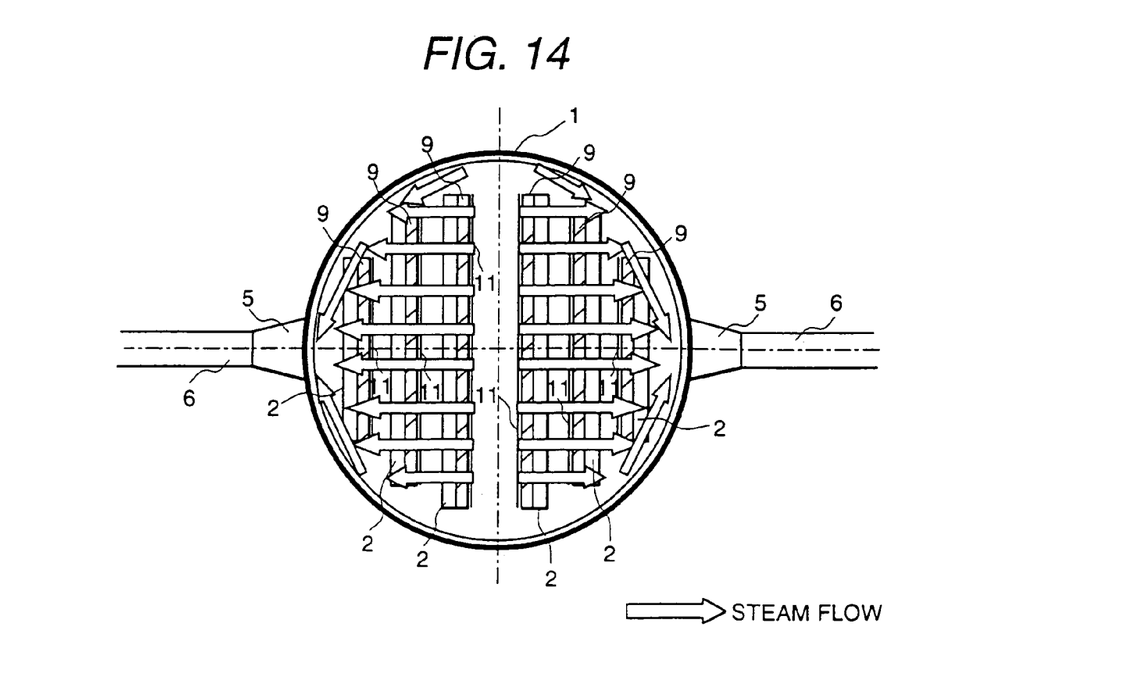
FIG. 14 is a cross-sectional plan view of the reactor pressure vessel which shows steam flow inside the reactor pressure vessel in the second embodiment in accordance with the present invention.

By employing such a construction, it is possible to form symmetrical steam flow not only with respect to the plane parallel to the steam outlet faces 11 and passing through the center of the reactor pressure vessel 1 but also with respect to the vertical plane perpendicular to the steam outlet faces 11 and passing through the center of the reactor pressure vessel 1, as shown by hollow arrows in FIG. 14. Therefore, the steam flow shown by the follow arrows in FIG. 14 becomes stable, and accordingly, the second embodiment can suppress deterioration in performance of the main steam system more effectively than the first embodiment. When the dry steam flow from the steam dryers 2 to the main steam nozzles 5 in this case is displayed on a vertical sectional plane, the steam flow can be expressed as shown by arrows in FIG. 9. The other matters are the same as those of the first embodiment. In the present embodiment, each set of the main steam nozzle 5 and the main steam pipe 6 is also disposed at a symmetrical position with respect to the plane parallel to the steam outlet faces 11 of the steam dryers 2 and passing through the center of the reactor pressure vessel 1, that is, with respect to the vertical plane including the dash-and-dot line A passing through the center of the reactor pressure vessel.

Figure 3:
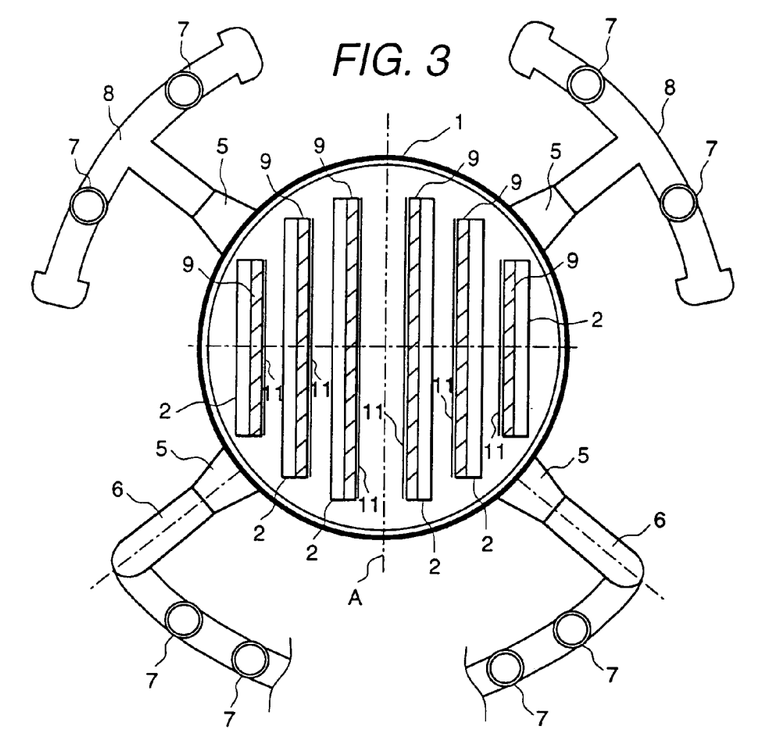
FIG. 3 is a cross-sectional plan view of a reactor pressure vessel which shows the construction of a third embodiment of a main steam system around a nuclear reactor in accordance with the present invention.

The third embodiment shown in FIG. 3 is a main steam system around a nuclear reactor which is obtained by adding additional structures to the first embodiment. The additional structures are two main steam headers 8 and two main steam nozzles 5 for connecting the two main steam headers to the reactor pressure vessel 1.

The added two main steam nozzles 5 are disposed vertically symmetrically to the two main nozzles 5 for connecting the two main steam pipes 6 to the reactor pressure vessel 1, as shown in FIG. 3. In other words, the added two main steam nozzles 5 and the two main steam nozzles 5 for connecting the two main steam pipes 6 to the reactor pressure vessel 1 are symmetrically disposed with respect to the vertical plane perpendicular to the steam outlet faces 11 of the steam dryers 2 and passing through the center of the reactor pressure vessel 1.

The added two main steam nozzles 5 are connected to the reactor pressure vessel 1, and a main steam header 8 is connected to each of the added two main steam nozzles 5 through a pipe. Two main steam safety relief valves 7 are provided in each of the main steam headers 8. These main steam safety relief valves also open when the pressure in the reactor pressure vessel reaches the-set pressure.

In the construction described above, since the main steam safety relief valves 7 provided in the main steam pipes 6 and the main steam headers 8 do not open during the normal operation period that the pressure in the reactor pressure vessel 1 does not reach the set pressure, steam in the reactor pressure vessel 1 is dried by the steam dryers 2 to be introduced into the main steam pipes 6 similarly to the case of the first embodiment, and steam flow entering into the main steam headers 8 does not occur. Therefore, steam flow after dried in the reactor pressure vessel 1 can keep the flow symmetry similarly to that of the first embodiment, and accordingly deterioration in performance of the main steam system can be suppressed.

However, once pressure in the reactor pressure vessel 1 reaches the set pressure of the main steam safety relief valves 7, the main steam safety relief valves 7 provided in the main steam pipes 6 and the main steam headers 8 open to discharge the steam inside the reactor pressure vessel 1 into cooling water in the pressure suppression chamber. Thereby, the pressure in the reactor pressure vessel 1 can be suppressed below the set pressure to secure the safety. The other contents are the same as those of the first embodiment.

Up to now, all the main steam safety relief valves 7 have been mounted on the main steam lines. However, in a nuclear power plant having a smaller output power capacity, number of the main steam safety relief valves 7 necessary to be mounted on one line of the main steam pipe 6 may be possibly increased because number of main steam pipes decreases though necessary number of the main steam safety relief valves 7 decreases corresponding to decrease in the output power capacity.

In a nuclear power plant having a smaller output power capacity, the amount of materials is reduced by decreasing the size of the reactor containment containing the main steam system. However, the size of the reactor containment must be possibly increased in order to secure routing spaces for the main steam pipes 6 when length of the main steam pipes 6 is increased due to mounting the main steam safety relief valves 7. In order to avoid this problem, it is necessary to reduce the number of the main steam safety relief valves 7 to be mounted on the lines of the main steam pipes 6.

In the third embodiment, as a means of reducing the number, the main steam headers 8 are provided, and the main steam safety relief valves 7 are disposed on the main steam headers 8. By employing the above construction, the number of the main steam safety relief valves 7 to be mounted on the lines of the main steam pipes 6 is reduced, and the main steam nozzles 5 for connecting the main steam pipes 6 and the main steam nozzle 5 for connecting the main steam headers 8 are disposed at symmetrical positions in the reactor pressure vessel 1 with equal angular spacing, as shown in FIG. 3. Thereby, steam flow inside the reactor pressure vessel 1 is kept stable even during operating condition of the main steam safety relief valves 7, and a nearly equal amount of steam flow can be discharged through each of the main steam pipes 6 and the main steam headers 8.

In the present embodiment, each of the main steam nozzle 5 is also disposed at a symmetrical position with respect to the plane parallel to the steam outlet faces 11 of the steam dryers 2 and passing through the center of the reactor pressure vessel 1, that is, with respect to the vertical plane including the dash-and-dot line A passing through the center of the reactor pressure vessel, and the main steam pipes 6 are individually connected to the main steam nozzles 5 in the lower half-circular portion in the horizontal section of the reactor pressure vessel in FIG. 3, and the main steam headers 8 are individually connected to the main steam nozzles 5 in the upper half-circular portion in the horizontal section of the reactor pressure vessel in FIG. 3.

As described above, the size of the reactor containment can be made compact without excessively routing the main steam pipes 6, and at the same time, deterioration in the performance of the main steam system can be suppressed.

Figure 4:
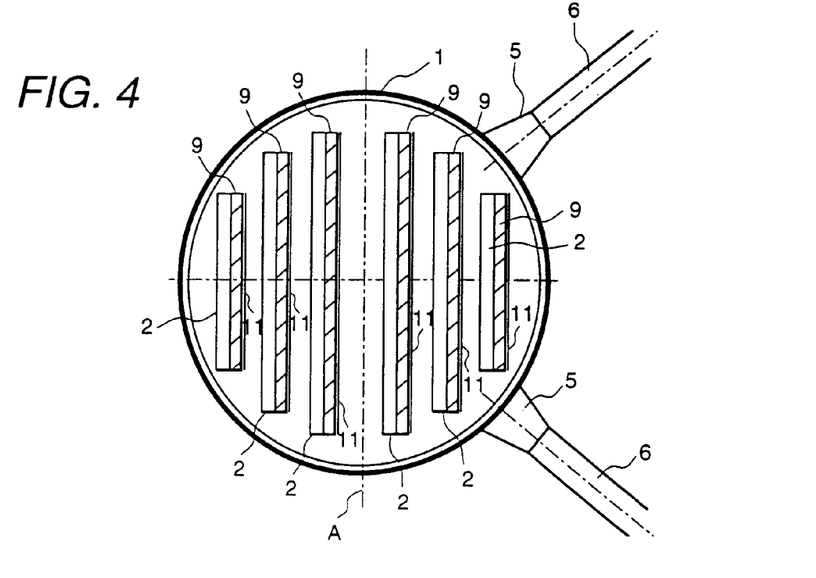
FIG. 4 is a cross-sectional plan view of a reactor pressure vessel which shows the construction of a fourth embodiment of a main steam system around a nuclear reactor in accordance with the present invention.

Similarly to the first embodiment, the fourth embodiment shown in FIG. 4 comprises steam separators 3 above a reactor core 4 in a reactor pressure vessel 1 containing the reactor core 4; and steam dryers 2 above the steam separators. Two main steam nozzles 5 are connected to the right-hand side half-circular portion of the reactor pressure vessel 1 in FIG. 4. Two main steam pipes 6 are individually connected to the main steam nozzle 5. A plurality of safety relief valves are disposed in each of the main steam pipes 6.

The steam dryer 2 has a construction similar to that of the steam dryer 2 shown in FIG. 7 and FIG. 8, and has a function of removing moisture from steam while the steam is flowing inside the hood 10 of the steam dryer 2 from the bottom to the top, and then passing through the gaps between the corrugated plates 9. The steam losing moisture becomes dry steam, and flows out of a steam outlet face 11 of the steam dryer 2.

The steam outlet faces 11 of the individual steam dryers 2 are oriented toward the right-hand half-circular side of the reactor pressure vessel 1 in FIG. 4, that is, toward the right-hand side direction in FIG. 4. Therefore, a set of the main steam nozzle 5 and the main steam pipe 6 is disposed at each symmetrical position with respect to a vertical plane perpendicular to the steam outlet face 11 of the steam dryer 2 and passing through the center of the reactor pressure vessel 1.

In such a main steam system around nuclear reactor described above, coolant in the reactor pressure vessel 1 is heated by the reactor core 4 to be changed to steam-water two-phase flow, and flows out into the upper portion of the reactor core 4. The steam-water two-phase flow flows into the steam separators 3 to be excluded the liquid phase portion, and only the steam is fed into the steam dryers 2 to be changed to dry steam by removing the moisture by the steam dryers 2.

Figure 11:
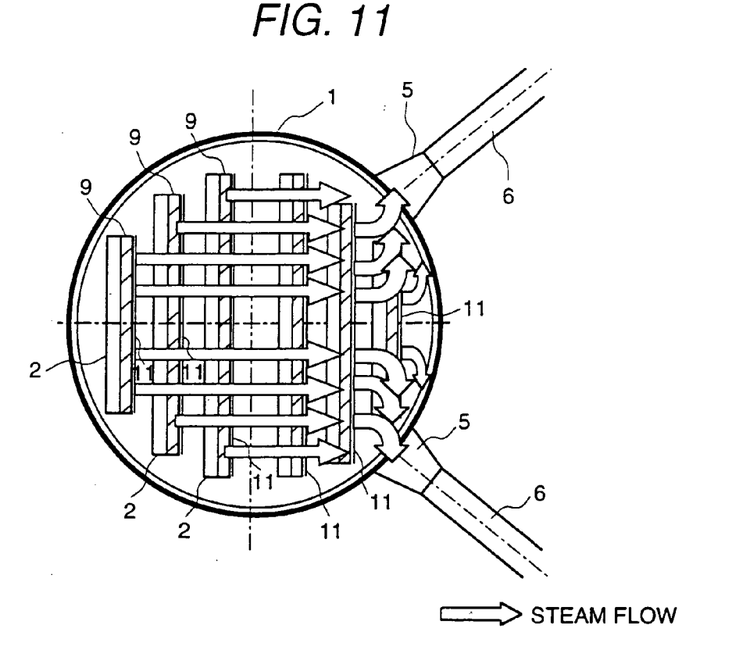
FIG. 11 is a cross-sectional plan view which shows steam flow inside the reactor pressure vessel in the fourth embodiment in accordance with the present invention.

The dry steam flows vertically in FIG. 11 and symmetrically out of the steam outlet faces 11 of the steam dryers 2 as shown by the hollow arrows in FIG. 11, and equally flows into the main steam pipes 6 through the main steam nozzles 5, and then is fed to a turbine apparatus for driving a generator. Dry steam used as energy for rotationally driving the turbine of the turbine apparatus is returned to liquid to be fed to the reactor pressure vessel 1 as the coolant again.

According to the present embodiment, in a case of disposing, particularly, two main steam pipes 6, steam flow in the reactor pressure vessel 1 becomes symmetrical flow with respect to the vertical plane perpendicular to the steam outlet faces 11 of the steam dryers 2 and passing through the center of the reactor pressure vessel 1, as shown by hollow arrows in FIG. 11, and accordingly the steam equally flows in the two main steam pipes 6. Thereby, deterioration in performance of the main steam system can be prevented.

When pressure in the reactor pressure vessel 1 reaches a set pressure of the main steam safety relief valves 7, the main steam safety relief valves 7 open. As the main steam safety relief valves 7 open, the steam inside the reactor pressure vessel 1 is discharged from the main steam safety relief valves 7 into cooling water in a pressure suppression chamber from through the main steam nozzles 5 and the main steam pipes 6. Thereby, the reactor pressure vessel 1 can avoid various events caused by excessive pressure rise. As described above, the discharged steam is condensed in the cooling water in the pressure suppression chamber.

In any of the first to the fourth embodiment, in the main steam system around the nuclear reactor composed of the reactor pressure vessel 1 having the reactor core 4; the steam dryers 2 contained in the reactor pressure vessel 1; and the main steam pipes 6 connected to the reactor pressure vessel 1, steam equally flows in the two main steam pipes 6, and accordingly deterioration in performance of the main steam system can be suppressed, as described above.

According to the present invention, it is possible to provide a main steam system around a nuclear reactor which can suppress deterioration in performance of the main steam system.

What is claimed is:

1. A main steam system provided around a nuclear reactor comprising:

steam dryers provided in a reactor pressure vessel which is cylindrical and which has a circular cross section, all steam outlet faces of said individual steam dryers being oriented in a same direction;

main steam nozzles located at positions in only a one-half-circumferential portion of said reactor pressure vessel on a side of said reactor pressure vessel faced by said steam outlet faces, the number of said main steam nozzles being two in total, and each of said positions of said main steam nozzles being symmetrical with respect to each other about a vertical plane passing through the center of said circular cross section of said reactor pressure vessel and intersecting said steam outlet faces at right angle; and main steam pipes being connected to said main steam nozzles.

2. A main steam system provided around a nuclear reactor comprising:

a cylindrical reactor pressure vessel having a circular cross section;

a plurality of steam dryers located in said pressure vessel, all of said steam dryers being positioned with steam outlet faces oriented in a first direction;

a maximum of two main steam nozzles, comprising a first main steam nozzle and a second main steam nozzle; and first and second main steam pipes connected to said first and second main steam nozzles, respectively, wherein said first and second main steam nozzles are each located at positions in only a half-circumferential portion of said reactor pressure vessel, as defined by a vertical plane bisecting said circular cross section perpendicularly to said first direction, and on a side of said vessel faced by said steam outlet faces, said first main steam nozzle and said second main steam nozzle being symmetrically disposed with respect to each other about a vertical plane bisecting said circular cross section parallel to said first direction.

* * * * *